Patented Mar. 23, 1954

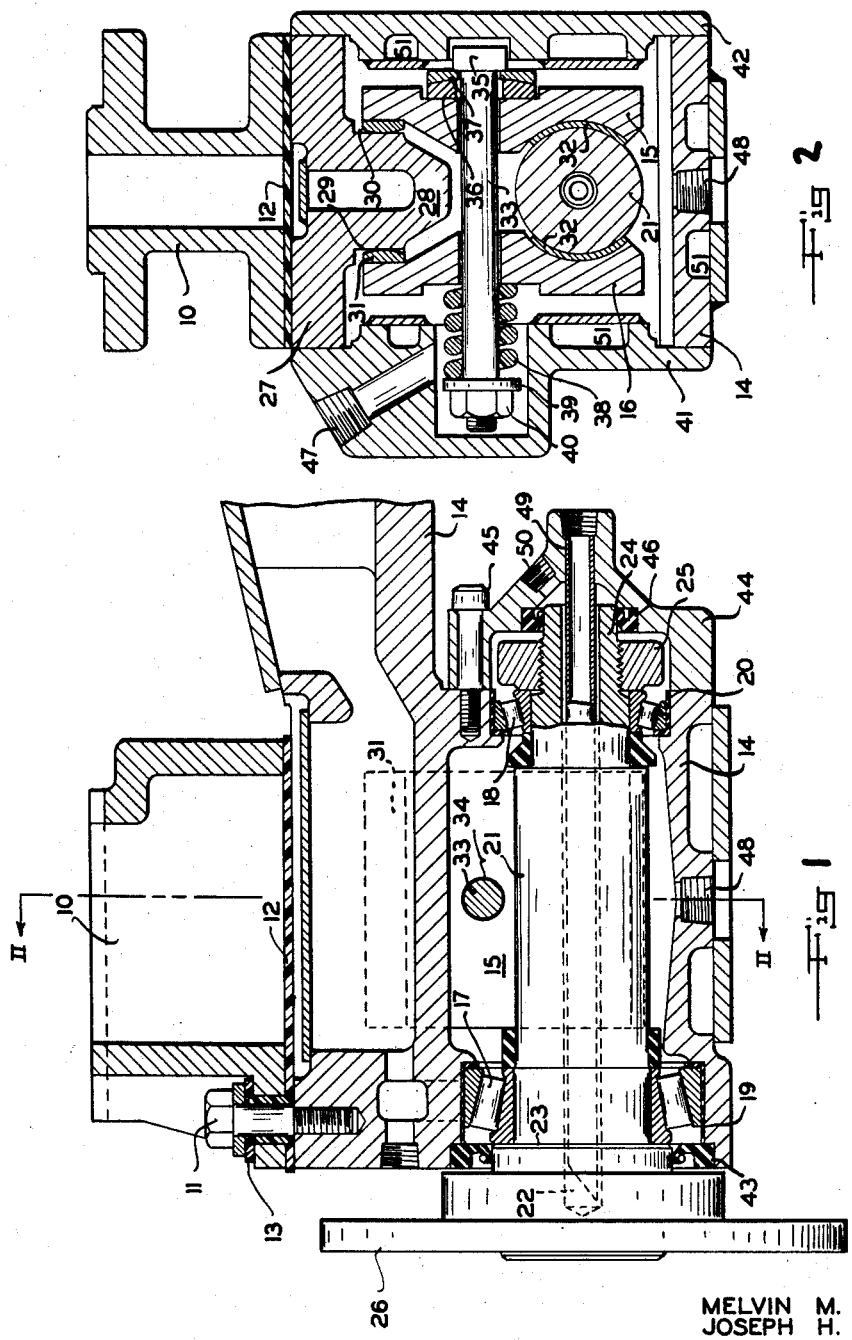

2,673,333

UNITED STATES PATENT OFFICE 2,673,333

ROTARY ELECTRODE ASSEMBLY

Melvin M. Seeloff and Joseph H. Cooper, Warren, Ohio, assignors to The Taylor-Winfield Corporation, Warren, Ohio, a corporation of Ohio Application November 30, 1951, Serial No. 259,167

9 Claims. (Cl. 339—8)

The present invention relates to an improved arrangement for conducting electric current between relatively moving conductor parts and finds particularly advantageous application where high current loads must be so conducted, as for example, in electric resistance welding.

It is an object of the present invention to provide a novel rotary type electrode assembly, particularly for use in electric resistance seam welding apparatus, having certain novel features of construction whereby electric current may be passed between the stationary and movable conductor members of the assembly with a minimum of loss of power due to contact resistance. Inherently accruing from such provision of low resistance contact between the movable and stationary members are increased operating life of such contact members and lesser cooling requirements as will be understood.

More particularly, a further object of the present invention is to provide a novel rotary electrode assembly wherein the rotary contact member is supported by means wholly independent of and electrically isolated from the contact path of the electric current passing through the assembly. In accordance with this object we may provide suitable anti-friction means for rotatably journaling the movable member of the electrode assembly whereby frictional resistance to movement of the movable electrode member is maintained at a minimum and mechanical impedance to movement of the electrode over the work or the work past the electrode is accordingly kept at a practical minimum. In addition to reduced frictional impedance the arrangement herein proposed provides that pressure applied to the electrode assembly in a direction transverse to the axis of rotation of the movable member will be totally absorbed in the anti-friction journaling means whereby uneven contact pressures between the relatively movable contact members are eliminated and the operating life thereof is proportionately increased. Further, our construction is such that while the rotary electrode is rigidly supported and may be moved or guided with precision in an assembly welding machine, the current-conducting assembly presents minimum interference with the welding throat space in the machine. The assembly is made up of relatively few parts and includes a simple arrangement for adjusting the contact pressure between the relatively movable parts of the assembly.

Another object of the present invention is the provision of a novel rotary electrode assembly having the above set forth characteristics which is, in addition, totally enclosed about the relatively movable contact members whereby the same may be maintained in a bath of lubricating fluid, as for example castor oil, to thus provide substantially frictionless relative movement between such contact members and to provide additional advantageous characteristics, as for example, improved electrical contact and improved cooling of the parts.

Another object of this invention is the provision in a rotary electrode assembly of the character described of certain provisions whereby the advantageous low resistance and long operating life characteristics are relatively unaffected by, for example, deflection of the anti-friction journaling means under operating pressure tending to alter the original alignment of the rotary member.

Other objects and advantages of the invention will become apparent upon full consideration of the following detailed specification and accompanying drawing wherein is illustrated a preferred embodiment of the invention.

In the drawing:

Figure 1 is an axial cross section of a rotary welding electrode assembly constructed in accordance with the teachings of our invention, showing particularly the general arrangement of the anti-friction journaling means and contact members; and Figure 2 is a cross sectional view taken along line II—II of Figure 1 showing details of the contact members or brushes constructed in accordance with the principles of the invention.

In Figure 1 the reference numeral 10 designates a mounting member which may be associated with suitable means, not shown, for effecting vertical movement of the electrode assembly and for applying pressure during a welding operation as will be understood. Mounted rigidly to the member 10 by bolts 11, but preferably electrically isolated from the member 10 by means of insulators 12 and 13, is a body member 14, of suitable current conductive material, which cooperatively serves to conduct current from a source, not shown, and to house contact brushes 15 and 16 and anti-friction bearings 17 and 18 as will appear. Bearings 17 and 18 are mounted in the body member 14 in spaced axially aligned relation as shown in Figure 1 and are electrically insulated from the housing 14 by means of insulating members 19 and 20. The said insulating members 19 and 20 are preferably of non-resilient material to avoid excessive deformation under operating load as will be understood.

Journaled by the bearings 17 and 18, which are preferably of the tapered roller type as illustrated, is a current conductive electrode spindle 21 having, in accordance with usual practice, internal passages therein, as at 22, for providing a continuous flow of cooling medium. The spindle 21 is provided at its forward end with a shoulder 23 which abuts against the bearing 17, and is threaded at its opposite end portion 24 to receive a nut 25. As shown, the inner or left hand end face of the nut 25 bears against the bearing 18, and it will be understood that by suitable axial adjustment of the nut 25 the spindle 21 may be firmly restrained against any longitudinal movement with respect to the body member 14. A conventional electrode wheel 26 is secured to the outer end of the spindle 21, and the wheel 26 may be provided with suitable cooling passages, not shown, communicating with the passage 22.

As shown in Figure 2, the upper portion 27 of the housing 14 is provided with a downwardly depending ridge 28 disposed generally parallel to the spindle 21 and having accurately machined substantially vertically side wall surfaces 29 and 30 thereon. To carry current from the member 14 to the rotating spindle 21 we have provided a pair of rigid contact brushes 15 and 16 of suitable current conducting material and having contact surfaces 31 and 32 at each the upper and lower portions thereof for contacting respectively the side wall surfaces 29 and 30 and the spindle 21. The contact surfaces 32, preferably of silver, are arcuately shaped to conform with the contour of the spindle 21, and in the embodiment shown contact by each surface 32 with the spindle 21 is made circumferentially over an arc in the order of 90 degrees and longitudinally over a substantial portion of the distance between the bearings 17 and 18. Contact surfaces 31, also preferably of silver, are arcuately shaped to a small degree and are adapted to have contact with the side wall surfaces 29 and 30 in the manner shown. The arcuate contours of the surfaces 31 provide that substantially the same contact is made between the surfaces 31 and the side walls 29 and 30 regardless of slight angular deviations of the contact brushes 15 and 16 such as, for example, would occur as the contact surfaces 32 become worn through prolonged use.

To hold the brushes 15 and 16 properly in contact with the spindle 21 and side wall surfaces 29 and 30 we provide a bolt 33 which is received in apertures 34 in each of the brushes 15 and 16; the said apertures being located substantially centrally between the spindle 21 and ridge portion 27 as shown. The head 35 of the bolt 34 bears, through washers 36 and 37 against the outer side wall of the contact brush 15, and to similarly bear against the outer side wall of brush 16 we provide a compressible coil spring 38, washer 39 and nut 40. Washers 36 and 37 are provided with complementary arcuate adjoining surfaces whereby pressure exerted thereon by the bolt 34 will be evenly applied to the contact brush 15 regardless of slight angular deviations of the said brush 15 with the bolt as the surfaces 32 become worn.

The above described combination of brushes 15 and 16 and the particular means for returning the same in proper contact with the spindle 21 and side wall surfaces 29 and 30 forms an important part of the present invention, and it should be particularly observed that by this arrangement the brushes 15 and 16, when positioned in contact with the spindle 21 and resiliently clamped by means of the bolt 34 and spring 38, inherently make the proper contact with the side wall surfaces 29 and 30 and retain such contact even though the contact surfaces 32 wear down and cause the brushes 15 and 16 to angle inwardly at their lower ends. It may also be observed that, with the exception of the radius of the arcuate surfaces 32 there are no critical dimensions which must be met in making the brushes 15 and 16, nor is the distance between the vertical side wall surfaces 29 and 30 at all critical; it being understood that the mere clamping of the said brushes 15 and 16 about the spindle 21 will inherently cause proper contact to be made at all points.

To provide lubrication for the contact surfaces 32 and the bearings 17 and 18 we prefer to enclose the said components in a fluid-tight housing and to maintain in said housing a bath of lubricating fluid, as for example castor oil, which is accordingly continuously applied to the moving parts to lubricate the same and which, in addition, serves to provide improved electrical contact between the various contact surfaces and to aid in removing the heat therefrom as will be understood.

An enclosed housing for the above mentioned purpose is formed by suitably securing side walls 41 and 42 to the member 14 as shown in Figure 2. The forward end of the housing is sealed by providing a resilient annular sealing member 43 positioned forwardly of the bearing 17 and extending from the member 14 into resilient contact with the spindle 21. At the opposite end of the housing we provide a cap member 44 which is secured to the member 14 by means of bolts 45. Extending between the cap member 44 and the spindle 21 near the end thereof is a resilient annular sealing member 46 which is operative to seal the right hand end of the housing in a fluid-tight manner as desired in accordance with the objects of this invention.

Shown in Figure 2 are filling and draining ports 47 and 48 respectively through which the housing may be properly maintained with a lubricating bath, and it will be understood that such lubricating bath may, if desired, be circulated throughout the housing by connecting suitable pump means, not shown, to the ports 47 and 48.

In the embodiment herein illustrated cooling medium for the spindle 21 is admitted into the passage 22 through a conduit member 49 which is secured in the cap member 44 and extends into the passage 22 in spaced concentric relation thereto. The flow of the medium is thus inwardly through the conduit 49 and outwardly through the annular space provided between the conduit 49 and the side walls of the passage 22. An outlet for the medium is provided by a port 50 in the cap member 44 as shown in Figure 1. In accordance with usual practice we also provide means for cooling the main housing of the assembly and this may be conventionally accomplished by providing a plurality of interconnected passages 51 in the member 14 and side walls 41 and 42 having suitable inlet and outlet ports, not shown, whereby the passages 51 may be connected with a source of cooling medium, also not shown.

It should now be apparent that we have accomplished the objects initially set forth. The rotary electrode assembly disclosed herein incorporates certain novel features of construction which lend generally to an arrangement whereby a rotary electrode-supporting spindle may be rotatably supported by means both structurally and electrically independent of the means for transferring the electrical current from the stationary conductor member to the rotating spindle, and particularly to a wholly practical and mechanically simplified arrangement for accomplishing the above general construction. It should be noted particularly that the electrode is rigidly supported both axially and radially and that the movable contact assembly provides large current-conducting surfaces which, however, do not extend to the lower surface of the electrode-carrying shaft so that there is a minimum of interference with the welding throat clearance in the assembled welding machine.

In the apparatus according to our invention we have provided a novel arrangement, including a pair of brushes 15 and 16 and ridge portion 27 of current conductive member 14, for conducting current from the ridge portion 27 to the spindle 21 which may be quickly and easily assembled by clamping the said brushes 15 and 16 on opposite sides of the spindle 21 and ridge portion 27 with a single clamping device, as for example the bolt 33 and coil spring 38 illustrated. With the brushes 15 and 16 so clamped the concave lower contact surfaces 32 thereof inherently assume the proper position relative to the spindle 21 whereby an even contact pressure is assured over the entire contact surface and the current is accordingly distributed evenly as is desired for minimum resistance to current flow and long operational life and other advantages as will be understood. At the upper point of contact we have provided each of the brushes 15 and 16 with a convex contact surface 31 which is adapted to bear against a flat substantially vertical machined surface 29 or 30, and it will be observed that as the lower contact surfaces 32 become worn through use, causing the brushes 15 and 16 to angle slightly inwardly, the upper contact surfaces 31 will merely roll over the flat surfaces 29 and 30 and maintain substantially the same area contact therewith whereby the advantageous electrical characteristics of the assembly are retained. It will also be apparent that the effectiveness of the assembly herein described is substantially unaffected by expansion and contraction of the parts as may occur during a welding or other current conducting operation since the convex contact surfaces 31 may slide freely along the flat side wall surfaces 29 and 30 to absorb any uneven expansion and contraction.

Our construction is further advantageous in that it readily lends itself to the provision of a lubricant bath about the contact surfaces 32 whereby the frictional wear is reduced to a minimum, and also whereby heat may be more readily carried away from the point of contact as will be understood.

In addition to the various electrical and structural advantages inherent in our electrode assembly it will be noted that the overall construction is one of utter simplicity, both in regard to the initial manufacture and assembly of the parts and in regard to such maintenance as may subsequently be required. The brushes 15 and 16 may be readily replaced when necessary and it will be noted that interchangeability of such brushes may be provided without undue regard to manufacturing tolerances. These features contribute materially to lowering the costs of the product as will be readily understood.

Having thus shown and specifically described a preferred form of our invention, what we claim as new and desire to secure by Letters Patent is:

1. In a rotary electrode assembly of the type having a housing, spaced anti-friction bearings in said housing, a current conductive spindle journaled by said bearings, and contact means for transferring electrical current from said housing to said spindle; the improvement in such assembly comprising a ridge portion on said body member depending downwardly therefrom and disposed above and parallel to said spindle and located intermediate said bearings, said ridge portion having flat substantially vertical side wall surfaces thereon, said contact means comprising a pair of current conductive brushes disposed one on each side of said ridge portion in contact therewith and extending downwardly into contact with said spindle, said brushes having upper and lower contact surfaces thereon adapted to contact respectively said ridge portion and said spindle, said lower contact surfaces having contours complementary to those of said spindle, said upper contact surfaces being of convex contour and adapted to bear against said flat side wall surfaces of said ridge portion, a bolt extending transversely through said brushes intermediate said spindle and said ridge portion, and spring means positioned over said bolt and adapted in combination with said bolt to yieldably draw said brushes together.

2. In a rotary electrode assembly of the type having a housing, spaced anti-friction bearings in said housing, a current conductive spindle journaled by said bearings, and contact means for transferring electrical current from said housing to said spindle; the improvement in such assembly comprising a ridge portion on said body member depending downwardly therefrom and disposed above and parallel to said spindle and located intermediate said bearings, said ridge portion having flat substantially vertical side wall surfaces thereon, said contact means comprising a pair of current conductive brushes disposed one on each side of said ridge portion in contact therewith and extending downwardly into contact with said spindle, said brushes having upper and lower contact surfaces thereon adapted to contact respectively said ridge portion and said spindle, said lower contact surfaces having contours complementary to those of said spindle, said upper contact surfaces being of convex contour and adapted to bear against said flat side wall surfaces of said ridge portion, resilient means acting on said brushes intermediate said spindle and said ridge portion adapted to urge said brushes into contact with said spindle and said ridge portion.

3. In a rotary electrode assembly of the type having a housing, spaced anti-friction bearings in said housing, a current conductive spindle journaled by said bearings, and contact means for transferring electrical current from said housing to said spindle; the improvement in such assembly comprising a ridge portion on said body member depending downwardly therefrom and disposed above and parallel to said spindle and located intermediate said bearings, said ridge portion having side wall surfaces thereon, said contact means comprising a pair of current conductive brushes disposed one on each side of said ridge portion in contact with the side wall surfaces thereon and extending downwardly into contact with said spindle, said brushes having upper and lower contact surfaces thereon adapted to contact respectively said ridge portion and said spindle, said upper contact surface being substantially in line contact with said side wall surfaces along a line parallel with said spindle, one of said last mentioned surfaces being of convex contour whereby said line contact is maintained regardless of angular movement of said brushes about the axis of said line, and resilient means acting upon said brushes adapted to urge said brushes into contact with said side wall surfaces and said spindle.

4. In a rotary electrode assembly of the type having a housing, spaced anti-friction bearings in said housing, a current conductive spindle journaled by said bearings, and contact means for transferring electrical current to said spindle; the improvement comprising a portion on said body member having a pair of current conductive side wall surfaces disposed parallel to said spindle, said contact means comprising a pair of current conductive brushes disposed one on each side of said spindle in contact therewith and each in contact with a side wall surface, said brushes having upper contact surfaces adapted to contact said side wall surfaces substantially along a line, one of said last-mentioned surfaces being generally of convex contour whereby said surfaces remain in contact substantially on a line regardless of angular movement of said brushes about the axis of said line, and resilient means adapted to urge said brushes into contact with said spindle and said side wall surfaces.

5. Apparatus according to claim 4 further characterized by said pair of current conductive side wall surfaces facing away from each other; and said resilient means including a bolt member extending through said brushes intermediate said spindle and said side wall surfaces, and a spring member adapted in combination with said bolt member to yieldably force said brushes together whereby the same are urged into pressure contact with said side wall surfaces and said spindle.

6. In a rotary electrode assembly of the type having a body member, spaced anti-friction bearings mounted in said member, a current conductive spindle journaled in said bearings, a relatively fixed current conductor, and contact means for transferring current from said fixed conductor to said spindle; the improvement in such assembly characterized by said relatively fixed current conductor being spaced from said spindle and having side wall surfaces disposed parallel to said spindle, and by said contact means comprising a pair of current conductive brush members positioned each in contact with a side wall surface and extending into contact with said spindle, said brush members being in contact with opposite sides of said spindle, said brush members having upper contact surfaces thereon adapted to make line contact with said side wall surfaces along a line parallel with said spindle, one of said last-mentioned surfaces being of convex contour whereby said line contact is maintained regardless of angular movement of said brush members about the axis of said line, and yieldable means acting cooperatively upon each of said brush members adapted to urge said members into pressure contact with said spindle and said side wall surfaces.

7. Apparatus according to claim 6 further characterized by said current conductive portion being located intermediate said bearings, side wall members secured to said body member and forming in combination therewith a substantially enclosed housing, and sealing means extending between said housing and said spindle externally of said bearings for rendering said housing fluid tight for the reception of a liquid lubricant bath about said bearings and said spindle.

8. In a rotary electrode assembly of the type having a body member, bearings mounted in said member, a current conductive spindle journaled in said bearings, a relatively fixed current conductor, and contact means for transferring current from said fixed conductor to said spindle; the improvement in such apparatus characterized by said fixed current conductor having an exposed surface portion, and by said contact means comprising a current conductive brush having a pair of contact surfaces adapted to contact respectively said spindle and said exposed surface portion, and resilient means for urging said brush simultaneously into contact with said surface portion and said spindle, said surface portion making substantial line contact with said brush along an axis parallel with said spindle whereby relatively uniform contact may be maintained regardless of angular movement of said brush about the axis of said line.

9. Apparatus according to claim 8 further characterized by said relatively fixed conductor comprising a ridge portion of said body member, said ridge portion disposed parallel to said spindle and located intermediate said bearings, and said brush contacting said spindle intermediate said bearings.

MELVIN M. SEELOFF.
JOSEPH H. COOPER.

References Cited in the file of this patent

UNITED STATES PATENTS

| Number | Name | Date |
|---|---|---|
| 1,910,882 | Caputo | May 23, 1933 |
| 2,006,835 | Kurtze | July 2, 1935 |
| 2,529,634 | Sciaky | Nov. 14, 1950 |